(No Model.)
J. H. SCOTT.
CULTIVATOR.
No. 394,619. Patented Dec. 18, 1888.
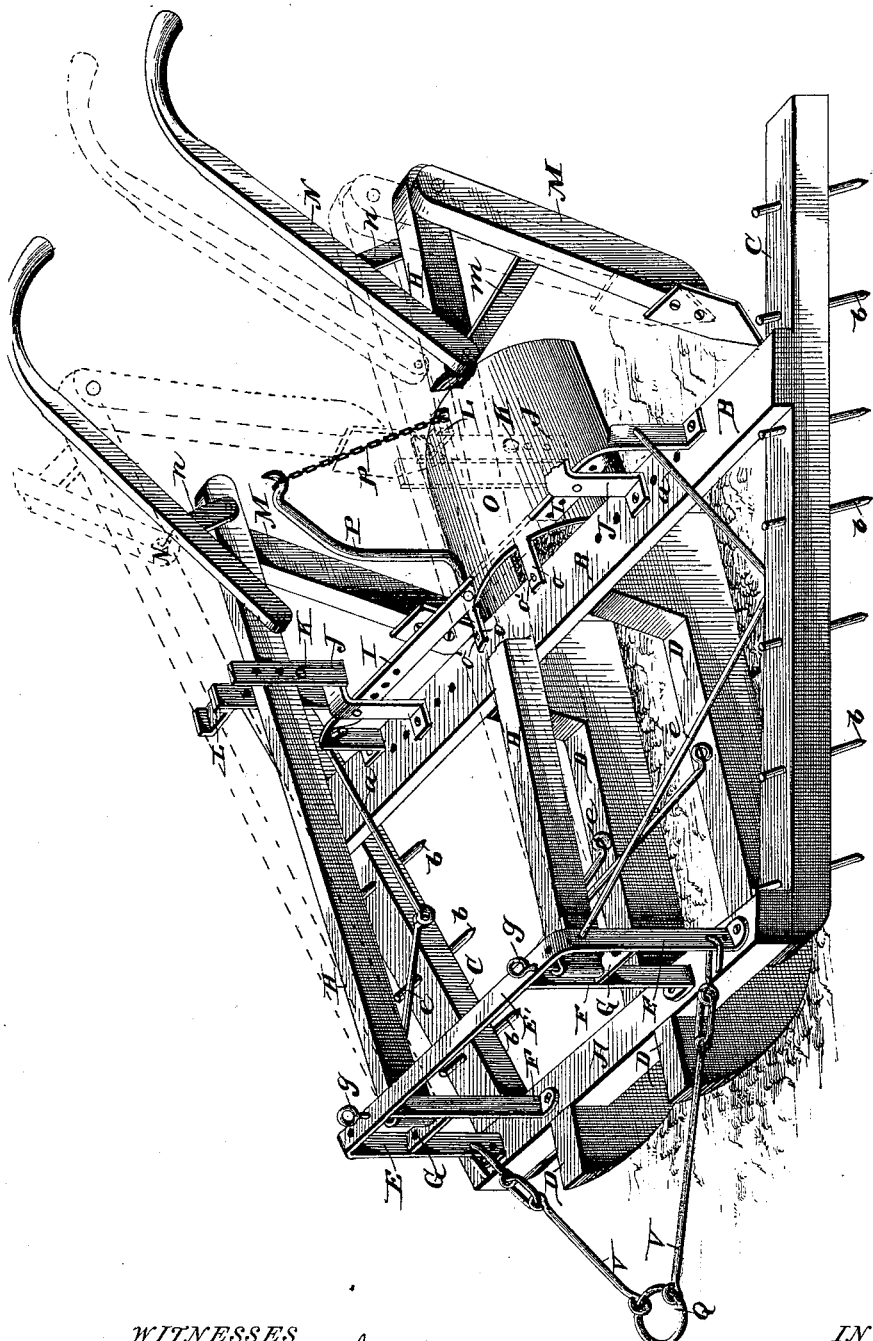
WITNESSES
M. H. Pumphrey.
Van Buren Hillyard.
INVENTOR
James H. Scott
By R. S. & A. P. Lacey
Attorneys

UNITED STATES PATENT OFFICE.

JAMES H. SCOTT, OF OAKLAND, IOWA.

CULTIVATOR.

SPECIFICATION forming part of Letters Patent No. 394,619, dated December 18, 1888.

Application filed September 7, 1888. Serial No. 284,823. (No model.)

*To all whom it may concern:*

Be it known that I, JAMES H. SCOTT, a citizen of the United States, residing at Oakland, in the county of Pottawattamie and State of Iowa, have invented certain new and useful Improvements in Cultivators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention relates to a combined harrow and cultivator for listed corn, and has for its object to provide a simple and compact implement that will be adjustable in all its parts, and which can be used solely as a harrow or as a combined harrow and cultivator.

The improvement consists of the peculiar construction and combination of the parts, which hereinafter will be more fully described and claimed, and shown in the annexed drawing, which is a perspective view, parts being broken away, of a machine of my invention.

The frame is approximately triangular in shape, having its apex removed, and is composed of the front bar, A, the rear bar, B, and the side bars, C, which incline in opposite directions and have the teeth *b* secured thereto. These teeth incline inwardly and rearwardly. The runners D are secured to the bars A and B and are set to run deeper than the teeth. The vertical standards E E at the ends of the bar A are united at their upper ends by the bar E', and the standards F, parallel with the standards E, are secured at their lower ends to the bar A and at their upper ends to the bar E'. The short bars G are secured between the standards E and F and form supports for the front ends of the cultivator-beams H, which are secured to the bars E' and G by the pins *g*, passing through a set of corresponding openings in the said bars E' and G and through the clevises at the ends of the said beams. By this construction it can readily be seen that the front ends of the beams can be separated or brought closer together, as required.

The bar I, having its ends bent down and secured to the bar B near each end thereof, is stayed by the braces *a*, which are interposed between its bent ends and the side bars, C, and the standards *e* are strengthened by the brace-rods *e*, which are interposed between them and the said side bars. The supports J, near each end of the bar B, are adjustably connected with the bar B and with the bar I by suitable fastening devices passing through them and through one of a series of openings in the said bars B and I. The upper ends of the supports are bifurcated and the rear ends of the beams H are secured between them and adjustable vertically by means of the bolts K, which are inserted in corresponding openings in the said supports.

Each of the supports is provided with a rest, L, at its side, in which the beam H is placed to hold it from the ground when not required. The cultivator-standards M are pivoted at their upper ends to the beams H, and are strengthened by the braces *m*, which are adjustably interposed between the said beams and the standards. The handles N are secured to the beams H in the usual manner and are braced by the braces *n*.

The fender or shield O is half-round in cross-section, and is secured to the bar B by the arms *o*, fitting over the pins *o'* on the said bar B. The rear end of the shield is supported by the chain *p* and the bracket P, which bracket extends from the bar I. By lengthening or shortening the chain *p* the rear end of the shield can be raised or lowered.

The draft-rods V, having their front ends secured to the ring Q, are provided at their rear end with short chains, which are adjustably connected with the standards E.

Having thus described my invention, what I claim, and desire to secure by Letters Patent, is—

1. The combination, with the frame, the bar I, and the supports J, having side rests, L, of the beams pivotally connected at their front ends with the frame and vertically adjustable on the supports J and adapted to be placed in the rests L, substantially as and for the purpose described.

2. The combination of the frame, the standards E and F, the bars E' and G, the beams H, the bar I, and the supports J, having side rests, substantially as described, for the purpose specified.

3. The herein-described harrow and cultivator, composed of the runners D D, the front bar, A, rear bar, B, oppositely-inclined side bars, C C, standards E E and F F, connected by the bar E', the supports J, having side rests, L, and adjustable on the bar B, the bar I, connected at its ends with the bar B and adjustably connected with the supports J J, the cultivator-beams H H, pivotally and adjustably connected at their front ends with the bar E' and vertically adjustable at their rear ends in the supports J, and the shield or fender O, substantially as and for the purpose described.

In testimony whereof I affix my signature in presence of two witnesses.

JAMES H. SCOTT.

Witnesses:
S. T. PERRY,
W. W. McRORY.